United States Patent

Nishimoto et al.

Patent Number: 5,912,288
Date of Patent: Jun. 15, 1999

[54] VULCANIZED RUBBER COMPOSITION

[75] Inventors: Kazuo Nishimoto, Kanagawa; Hitoshi Yamada, Tokyo; Atsushi Murakami, Chiba, all of Japan

[73] Assignee: Nichias Corporation, Tokyo, Japan

[21] Appl. No.: 08/698,933

[22] Filed: Aug. 16, 1996

[51] Int. Cl.$^6$ ....................................... C08K 3/00
[52] U.S. Cl. ........................ 524/114; 524/394; 524/399
[58] Field of Search ..................... 524/114, 394, 524/399

[56] References Cited

U.S. PATENT DOCUMENTS

| | | | |
|---|---|---|---|
| 3,856,728 | 12/1974 | Abramoff | 260/23.7 N |
| 4,981,728 | 1/1991 | Homma et al. | 427/386 |
| 5,336,703 | 8/1994 | Homma et al. | 523/435 |

FOREIGN PATENT DOCUMENTS 7216309   8/1995   Japan .

OTHER PUBLICATIONS

Patent Abstracts of Japan, vol. 010, No. 377 (C–392), Dec. 16, 1986 & JP–A–61 168639 (Mitsuboshi Belting Ltd), Jul. 30, 1986.

Patent Abstracts of Japan, vol. 013, No. 187 (C–592), May 2, 1989 & JP–A–01 014255 (Dneki Kagaku Kogyo KK) Jan. 18, 1989.

Database WPI, Section Ch, Weel 9648, Derwent Publications Ltd., London, GB; Class A12, AN 96–482360 XP002022138 & JP–A–08 245 842 (Nichias Corp) Sep. 24, 1996.

*Primary Examiner*—Edward J. Cain
*Attorney, Agent, or Firm*—Pillsbury Madison & Sutro LLP

[57] ABSTRACT

Disclosed is a rubber composition for fluorocarbons and/or refrigerating machine oil use, which comprises at least one of a nitrile group-containing rubber, a chloroprene rubber, and an ethylene propylene rubber as a base and at least one of an epoxy compound selected from the group consisting of a monofunctional epoxy compound, a glycidyl ether type epoxy compound and a glycidyl ether type epoxy compound and a compound represented by formula:

(I)

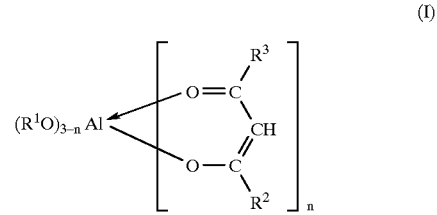

wherein $R^1$ represents a hydrogen atom or an alkyl group, $R^2$ represents an alkyl group or a phenyl group, $R^3$ represents an alkyl group, an alkoxy group or an alkenyloxy group, and n is 1 or 2.

24 Claims, No Drawings

VULCANIZED RUBBER COMPOSITION

FIELD OF THE INVENTION

This invention relates to a vulcanized rubber composition which is used in the presence of fluorocarbons and/or refrigerating machine oil, and moldings thereof.

BACKGROUND OF THE INVENTION

Destruction of ozone layer is now regarded as a serious problem, such that it has been decided to terminate use of several fluorocarbon gases which destruct ozone within the next several years. Because of this, fluorocarbon gases to be used as coolants of refrigerating machines, air conditioners and the like are now being changed from CFC (fluorocarbons comprised of three elements C, F and Cl) such as R-11 ($CCl_3F$) and R-12 ($CCl_2F_2$), HCFC (fluorocarbons comprised of four elements C, H, Cl and F) such as R-22 ($CHClF_2$) and R-123 ($CHClFCClF_2$), and HFC (fluorocarbons comprised of three elements C, H and F; ozone destruction coefficient, 0) such as R-134a ($CH_2FCF_3$) and R-407c ($CH_2F_2/CF_3CHF_2/CH_2FCF_3$ mixture (23/25/52 wt %)). In response to this, refrigerating machine oils to be used (lubricating oils of refrigerating machines) are also changing from mineral oils used in combination with the old fluorocarbons to oils of ester type, polyalkylene glycol type, etc.

With such substitution of coolants and refrigerating machine oils, rubber products suited for these substitutes have been called for. The conventionally used fluoroelastmer is eroded by the new fluorocarbon R-134a. Also, chloroprene rubber accelerates hydrolysis of ester oil and deteriorates refrigerating machine oil. As a consequence, vulcanized rubber compositions based on nitrile rubber or chlorinated polyethylene have been examined as the rubber for use with the new fluorocarbons.

For example, JP-A-3-250037 (the term "JP-A" as used herein means an "unexamined published Japanese patent application") proposes a vulcanized rubber composition which contains nitrile rubber, chlorinated polyethylene and an organic peroxide, JP-A-5-140334 proposes a rubber molding for substitute fluorocarbons use which comprises chlorinated rubber (chlorinated polyethylene, chloroprene rubber or the like) and nitrile rubber, and JP-A-6-128415 proposes a blend rubber composition in which an organic peroxide is added to a blend of nitrile rubber and chlorinated ethylene-propylene copolymer rubber.

However, when a vulcanized rubber composition containing chlorinated rubber is used in a refrigerating machine oil, chlorine as a component thereof acts as a catalyst to accelerate hydrolysis of the refrigerating machine oil, thereby causing a problem of reducing lubricity due to reduced viscosity. Such a tendency becomes particularly significant when fluorocarbon is present or the refrigerating machine oil is an ester oil. Though JP-A-5-140334 describes that a metal oxide, a metal hydroxide, a metallic soap and the like are contained in a vulcanized rubber composition, these metal compounds further accelerate hydrolysis of ester oil.

In addition, JP-B-5-17930 (the term "JP-B" as used herein means an "examined Japanese patent publication") discloses a vulcanized rubber composition for O-ring molding use in which 10 to 150 parts by weight of carbon black is added to 100 parts by weight of hydrogenated nitrile rubber, and JP-A-5-65369 discloses a vulcanized rubber composition which comprises hydrogenated nitrile rubber having a Mooney viscosity of 100 or more ($ML_{1+4}$ (100° C.)) and an organic peroxide. However, even the vulcanized rubber compositions produced by these techniques are not always satisfactory with regard to their resistance to fluorocarbons and refrigerating machine oils and to deterioration of refrigerating machine oils.

SUMMARY OF THE INVENTION

An object of the present invention to provide a vulcanized rubber composition which hardly accelerates deterioration of refrigerating machine oils (e.g., hydrolysis of ester oils) and which exhibits excellent resistance against fluorocarbons and refrigerating machine oils.

The inventors of the present invention have found that a vulcanized rubber composition which hardly accelerates deterioration of refrigerating machine oils including hydrolysis of ester oils, while showing markedly improved resistance against fluorocarbons and refrigerating machine oils, can be obtained by incorporating a specific epoxy compound in a specific rubber composition.

The present inventors have found also that the same effect can be obtained by incorporating a specific aluminum complex in a specific rubber composition.

Particularly, according to the present invention, there is provided a rubber composition for fluorocarbons and/or refrigerating machine oil use, which comprises at least one of a nitrile group-containing rubber, a chloroprene rubber, and an ethylene propylene rubber as a base and a monofunctional epoxy compound contained therein.

Also, according to the present invention, there is provided a rubber composition for fluorocarbons and/or refrigerating machine oil use, which comprises at least one of a nitrile group-containing rubber, a chloroprene rubber and an ethylene propylene rubber as a base and a glycidyl ether type epoxy compound contained therein.

In addition, according to the present invention, there is provided a rubber composition for fluorocarbons and/or refrigerating machine oil use, which comprises at least one of a nitrile group-containing rubber, a chloroprene rubber and an ethylene propylene rubber as a base and a compound represented by the following formula:

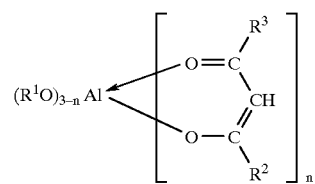

(wherein $R^1$ represents a hydrogen atom or an alkyl group, $R^2$ represents an alkyl group or a phenyl group, $R^3$ represents an alkyl group, an alkoxy group or an alkenyloxy group, and n is 1 or 2) contained therein.

Other objects and advantages of the present invention will be made apparent as the description progresses.

DETAILED DESCRIPTION OF THE INVENTION

The term "nitrile group-containing rubber" as used herein includes various types of nitrile rubber (NBR) and hydrogenated nitrile rubber (HNBR) and modified nitrile rubber (e.g., carboxylated nitrile rubber (CNBR)), which is hereinafter referred to as "nitrile based rubber" sometimes. The nitrile based rubber to be used in the present invention has no particular limitations with regard to its nitrile content, hydrogenation ratio, molecular weight, Mooney viscosity and the like, and a plurality of nitrile rubber, hydrogenated nitrile rubber and/or modified nitrile rubber may be used in combination.

The term "chloroprene rubber" (CR) as used herein include all types of 2-chlorobutadiene-based rubber. The CR is divided into sulfur modification type, non-sulfur modification type and high crystalline type, and any of these types can be used in the present invention. However, it is desirable to use the non-sulfur modification type CR. When the non-sulfur modification type CR is used, deterioration of refrigerating machine oil can be inhibited more effectively than the case of other types of CR.

The term "ethylene propylene rubber" (EP, EPDM) as used herein means a rubber product which comprises mainly a copolymer of ethylene and propylene and, in some cases, a small amount of diene component. According to the present invention, it is preferred to use EPDM which contains dicyclopentadiene, ethylidene norbornene or 1,4-hexadiene, particularly ethylidene norbornane, as a diene component. By the use of such a type of EPDM, resistance of the vulcanized rubber composition against fluorocarbons or refrigerating machine oil can be improved more efficiently.

As the material rubber of the present invention, a blend of two or more of the above-mentioned rubbers may be used. Various known rubber products other than the above-mentioned rubbers may also be used jointly. Examples of such products include natural rubber (NR), isoprene rubber (IR), styrene butadiene rubber (SBR), butadiene rubber (BR), butyl rubber (IIR), urethane rubber (U), silicone rubber (Q), fluorine rubber (F), acrylic rubber (ACM), epichlorohydrin rubber (CO), chlorosulfonated polyethylene (CSM), chlorinated polyethylene (CM) and the like, though the material rubber which can be used in the present invention is not limited to the above-mentioned rubbers. However, according to the present invention, it is desirable that the total amount of the nitrile based rubber, chloroprene rubber and ethylene propylene rubber is 40% by weight or more, more preferably 50% by weight or more, most preferably 80% by weight or more, based on the total rubber (weight of the material rubber after exclusion of epoxy compound, vulcanizing agent, filler and the like from the rubber composition).

According to the present invention, it is particularly preferable to use hydrogenated nitrile rubber. When hydrogenated nitrile rubber is used, the vulcanized rubber composition shows markedly excellent resistance against fluorocarbons and refrigerating machine oil, and deterioration of refrigerating machine oil can be controlled to an extremely low level. Hydrogenated nitrile rubber (hereinafter referred to as "HNBR") is manufactured by Nippon Zeon Co., Ltd. under a trade name of "Zetpol" and by Bayer under a trade name of "Therban". HNBR may have an iodine value of preferably about 50% or less, more preferably about 3 to 40%, most preferably from about 8 to 30%, as the central value. Resistance against fluorocarbons and refrigerating machine oil can be increased when HNBR having a central iodine value of 50% or less (high hydrogenation ratio) is used, and rubber elasticity at a low temperature can be kept by the use of the rubber having a low hydrogenation ratio. The central value of the nitrile content of HNBR is preferably from about 15 to 60%, more preferably from about 30 to 55%, most preferably from about 40 to 50%. Resistance against fluorocarbons and refrigerating machine oil can be increased by the use of HNBR having a nitrile content of about 15% or more, particularly about 30% or more, and low-temperature resistance can be kept by the use of the rubber having a nitrile content of about 60% or less, particularly about 50% or less. In addition, its Mooney viscosity as the central value of $ML_{1+4}$ (100° C.) (hereinafter referred to as "Mooney viscosity") is preferably from about 55 to 100, more preferably from about 65 to 95, most preferably from 75 to 90. When HNBR having a Mooney viscosity falling within this range is used, the vulcanized rubber composition can keep high resistance against fluorocarbons and refrigerating machine oil and good flexibility and low-temperature resistance.

Liquid nitrile rubber (hereinafter referred to as "liquid NBR") may be used jointly as a material of the vulcanized rubber composition of the present invention. The term "liquid NBR" as used herein means nitrile rubber which shows fluidity at room temperature. Rubber which does not show fluidity at room temperature is hereinafter referred to as "solid rubber". The room temperature means generally from about 0 to 50° C., especially from about 15 to 35° C. The liquid NBR is manufactured by Japan Synthetic Rubber Co., Ltd. under a trade name of "N280" and by Nippon Zeon Co., Ltd. under trade names of "Nipol 1312" and "Nipol DN601". For example, when liquid NBR is added in an amount of 50 parts by weight or less, particularly 30 parts by weight or less, to 100 parts by weight of solid rubber, the hardness of the vulcanized rubber composition can be reduced without spoiling the beneficial effects of the present invention. In addition, resistance against fluorocarbons and refrigerating machine oil can be further improved depending on the use conditions of the vulcanized rubber composition. Particularly, such an effect is significant when the solid rubber is mainly HNBR. The liquid NBR may be used in an amount of preferably about 50 parts by weight or less, more preferably about 30 parts by weight, most preferably about 20 parts by weight or less, based on 100 parts by weight of HNBR.

Vulcanized rubber is well known by itself and can be obtained by crosslinking uncrosslinked rubber using a peroxide. The peroxide to be used in the crosslinking is not limited, but examples thereof include di-t-butyl peroxide, dicumyl peroxide, t-butylcumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexyne-3, 1,3-di(t-butylperoxyisopropyl)benzene, 2,5-dimethyl-2,5-di(benzoylperoxy)hexane, t-butyl peroxyisopropylcarbonate, n-butyl-4,4-di(t-butylperoxy) valerate, α,α'-bis(t-butylperoxy-m-isopropyl)benzene, benzoyl peroxide and the like. The peroxide may be used by mixing it with carbon black, calcium carbonate, rubber and the like in advance. The peroxide may be used in an amount of preferably from about 0.5 to 30 parts by weight, particularly from about 1 to 15 parts by weight, based on 100 parts by weight of the rubber. If the amount of the peroxide is smaller than 0.5 part by weight, there is a possibility that resistance of the vulcanized rubber composition against fluorocarbons and refrigerating machine oil will not be improved sufficiently, and if the amount of peroxide is larger than 30 parts by weight, there is a possibility that the vulcanized rubber composition will be hardened. Separately from the above, chloroprene rubber or carboxylated nitrile rubber may be crosslinked using a metal oxide such as magnesium oxide and zinc oxide or a metal peroxide. For example, magnesium oxide may be used in an amount of preferably from about 0.5 to 20 parts by weight, more preferably from 1 to 10 parts by weight, most preferably from 2 to 6 parts by weight, based on 100 parts by weight of chloroprene rubber. In addition, rubber other than HNBR having a hydrogenation ratio of 100% may also be crosslinked using a sulfur and/or vulcanization accelerator. The aforementioned crosslinking agents may be further blended with various coagents such as triallyl isocyanulate, ethylene glycol dimethacrylate, trimethylolpropane trimethacrylate, polybutadiene, polyfunctional methacrylate monomer, polyhydric alcohol (meth)acrylate and the like; or with a thiuram type vulcanization accelerator such as tetramethylthiuram disulfide (TT), tetraethylthiuram disulfide (TET), and tetrabutylthiuram disulfide (TBT), a thiazole type accelerator such as dibenzothiazyl disulfide and 2-mercaptobenzothiazole, a guanidine type accelerator such as trimethylthioure and 1,3-diphenylguanidine, a sulfenamide type accelerator such as N-cyclohexyl-2-benzothiazolyl sulfenamide, a dithiocarbamate type accelerator such as zinc dimethyldithiocarbamate and zinc, a xanthogenate type accelerator such as zinc butylxanthogenate, hexamethylenetetramine, n-butylaldehyde aniline and the like.

Molding can be effected by using an injection molding machine, a compression molding machine, a vulcanizing press or the like and, for example, carrying out crosslinking at a temperature of about 150 to 250° C. for about 3 to 60 minutes. Post cure may be carried out in an oven of about 120 to 200° C. for 1 to 24 hours.

An important requirement in the present invention is that a specific epoxy compound or a specific aluminum complex is contained in the aforementioned vulcanized rubber composition. By doing this, a vulcanized rubber composition which hardly accelerates deterioration of refrigerating machine oil and which shows excellent resistance against both fluorocarbons and refrigerating machine oil can be obtained. Particularly, when used in an ester based refrigerating machine oil, hydrolysis of the refrigerating machine oil is restrained. The degree of the deterioration caused by hydrolysis and the like is evaluated by the total acid number of the oil. The total acid number becomes large as the deterioration progresses. In the present invention, increase in the total acid number is restrained. In addition, the vulcanized rubber composition of the present invention in which a specific epoxy compound is blended shows excellent water resistance, solvent resistance, electric characteristics, mechanical characteristics, adhesive property and heat resistance, in comparison with a vulcanized rubber composition which does not contain the epoxy compound.

The specific epoxy compound which can be used in the present invention includes a monofunctional epoxy compound (a compound which contains one group of the following formula A, particularly one group of the formula (A'), in its molecule) and a glycidyl ether based epoxy compound (an ether containing a group of the following formula (B) in its molecule).

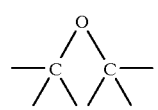
(A)

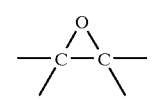
(A')

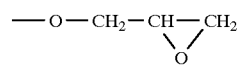
(B)

Examples of such epoxy compounds include monofunctional epoxy compounds such as epoxybutane, epoxybutene, epoxycyclohexane, epoxynorbornane, epoxyhexene, epoxyoctene, glycidol, glycidyl phthalimide and the like; glycidyl ether type epoxy compounds such as neopentyl glycol diglycidyl ether, bisphenol A diglycidyl ether, polyethylene glycol diglycidyl ether, glycerol polyglycidyl ether, triglycidyltris(2-hydroxyethyl) isocyanurate and the like; and monofunctional glycidyl ether type epoxy compounds such as methyl glycidyl ether, ethyl glycidyl ether, propyl glycidyl ether, butyl glycidyl ether, pentyl glycidyl ether, hexyl glycidyl ether, cyclohexyl glycidyl ether, nonyl glycidyl ether, methyl ethyl cyclohexyl glycidyl ether, 2-ethyl hexyl glycidyl ether, dodecyl glycidyl ether, tridecyl glycidyl ether, icosyl glycidyl ether, phenyl glycidyl ether, toluyl glycidyl ether, benzyl glycidyl ether, p-tert-butyl phenyl glycidyl ether, dibromophenyl glycidyl ether, naphthyl glycidyl ether, lauryl glycidyl ether, allyl glycidyl ether, isopropenyl glycidyl ether, butenyl glycidyl ether, phenyl glycidyl penta(ethyleneoxy) ether, lauryl glycidyl pentadeca (ethyleneoxy) ether and the like, but examples of the epoxy compounds which can be used in the present invention are not limited to the above-exemplified epoxy compounds. These epoxy compounds may be used alone or as a mixture of two or more.

However, it is desirable to use a monofunctional glycidyl ether type epoxy compound as the epoxy compound. By doing this, deterioration of refrigerating machine oil can be controlled at a more lower level, and resistance of the vulcanized rubber composition against fluorocarbons and refrigerating machine oil can also be improved further efficiently. When a compound having a plurality of epoxy groups in one molecule is used, low-temperature resistance and rubber elasticity of the vulcanized rubber composition are reduced slightly. In addition, though increase in the total acid number of refrigerating machine oil can be restrained, colloidal precipitate is formed in some cases depending on the kind and use condition of the refrigerating machine oil.

Furthermore, it is preferred that the epoxy compound contains an alkyl group and/or an alkenyl group. When an epoxy compound having no alkyl or alkenyl group is used, increase in the total acid number of refrigerating machine oil can be restrained, but colloidal precipitate may be formed depending on the kind of the refrigerating machine oil and use condition. The epoxy compound preferably has an epoxy equivalent (gram number of a compound containing 1 g equivalent of epoxy group) of 100 or more, particularly 170 or more. When the epoxy equivalent is too small, colloidal precipitate may be formed depending on the kind of the refrigerating machine oil and use condition. An epoxy compound having a branched alkyl and/or alkenyl group, such as an allyl group and a vinyl group, may be used. Particularly preferred is an epoxy group having an alkyl group having 7 to 15 carbon atoms. By the use of such a compound, increase in the total acid number of refrigerating machine oil is restrained more efficiently, and resistance of the vulcanized rubber composition against fluorocarbons and refrigerating machine oil is simultaneously improved. When the molecular weight of the epoxy compound is 1,000 or less, particularly 300 or less, the vulcanized rubber composition becomes flexible. When the epoxy compound has a molecular weight of larger than 1,000, particularly exceeding 3,000, exudation hardly occurs.

According to the present invention, the epoxy compound is used in an amount of preferably from about 0.1 to 50 parts by weight, more preferably from about 1 to 40 parts by weight, most preferably from about 3 to 30 parts by weight, based on 100 parts by weight of the rubber. If the amount of the epoxy compound is smaller than about 0.1 part by weight, decrease in the total acid number of refrigerating machine oil and improvement of resistance of the vulcanized rubber composition against flon and refrigerating machine oil may be insufficient. If the amount of epoxy compound is larger than about 50 parts by weight, improvement in the resistance of the vulcanized rubber composition against fluorocarbons and refrigerating machine oil may be insufficient.

The specific aluminum complex which can be used in the present invention is a compound represented by the following formula (hereinafter referred to as "Compound (I));

(I)

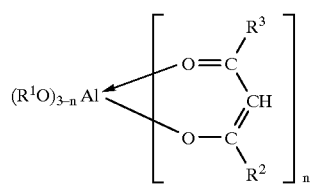

wherein $R^1$ represents a hydrogen atom or an alkyl group, $R^2$ represents an alkyl group or a phenyl group, $R^3$ represents an alkyl group, an alkoxy group or an alkenyloxy group, and n is 1 or 2.

Examples of Compound (I) include mono-(oleyl-3-oxobutanoate-$O^1,O^3$ )-bis-(2-propanolate)-aluminum (III) (hereinafter referred to as "OBPA"), aluminum (III) di-sec-butoxide ethylacetoacetate (hereinafter referred to as "ABEA"), aluminum (III) diisopropoxide ethylacetoacetate (hereinafter referred to as "AIEA"), bis-(oleyl-3-oxobutanoate-$O^1,O^3$)-mono-(2-propanolate)-aluminum (III), mono-(stearyl-3-oxobutanoate-$O^1,O^3$)-bis-hydroxy-aluminum (III), mono-(ethyl-3-oxobutanoate-$O^1,O^3$)-bis-hydroxy-aluminum (III), mono-(ethoxy-3-oxobutanoate-$O^1$, $O^3$)-bis-hydroxy-aluminum(III), mono-(ethoxy-3-oxobutanoate-$O^1,O^3$)-bis-(2-propanolate)-aluminum (III), mono-(propoxy-3-oxobutanoate-$O^1,O^3$)-bis-(2-propanolate)-aluminum (III), mono-(oleyl-3-oxo-3-phenylpropionate-$O^1,O^3$) -bis-(2-propanolate)-aluminum (III) and the like, but Compound (I) is not limited to the above-exemplified compounds. Compound (I) may be used alone or as a mixture of two or more. However, in Compound (I), it is preferable that $R^1$ is an alkyl group having 1 to 5 carbon atoms, $R^2$ is an alkyl group having 1 to 5 carbon atoms and $R^3$ is an alkoxy group having 1 to 25 carbon atoms. More preferably, $R^1$ is an isopropyl group or a sec-butyl group, $R^2$ is a methyl group, $R^3$ is an ethoxy group or —$OC_{18}H_{35}$ and n is 1. When one of such compounds, particularly OBPA ($R^1$=an isopropyl group, $R^2$=a methyl group, $R^3$=—$OC_{18}H_{35}$, n=1), ABEA ($R^1$=a sec-butyl group, $R^2$ a methyl group, $R^3$=an ethoxy group, n=1) or AIEA ($R^1$=an isopropyl group, $R^2$=a methyl group, $R^3$=an ethoxy group, n=1), is selected as Compound (I), resistance of the rubber composition against fluorocarbons and refrigerating machine oil is improved more significantly, and increase in the total acid number of refrigerating machine oil is restrained more strongly.

Chemical formulae of the aforementioned more preferred examples of Compound (I) are shown in the following.

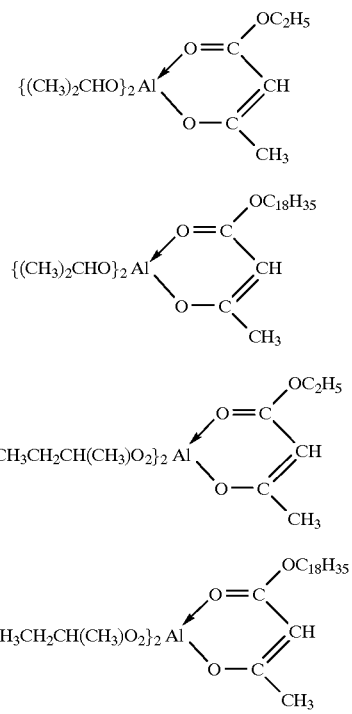

According to the present invention, Compound (I) is used in an amount of preferably from about 0.01 to 20.0 parts by weight, more preferably from about 0.05 to 10.0 parts by weight, most preferably from about 0.1 to 5.0 parts by weight, based on 100 parts by weight of the rubber. If the amount of Compound (I) is smaller than about 0.01 part by weight, improvement in the resistance of the rubber composition against fluorocarbons and refrigerating machine oil and decrease in the total acid number of refrigerating machine oil may be insufficient. If the amount of compound (I) is larger than about 20 parts by weight, the total acid number of refrigerating machine oil would not be further decreased.

In the more preferred mode of the present invention, the aforementioned epoxy compound and Compound (I) are used jointly in the aforementioned amounts. By such joint use, resistance of the rubber composition against fluorocarbons and refrigerating machine oil is improved more significantly, and the total acid number of refrigerating machine oil is reduced to a lower level.

The aforementioned vulcanized rubber composition of the present invention which contains a specific epoxy compound and/or Compound (I) can restrain deterioration of refrigerating machine oil. Particularly, when used in the presence of an ester type refrigerating machine oil, the inventive composition shows an advantage in that total acid number of the ester oil becomes small in comparison with the conventional vulcanized rubber composition which does not contain the epoxy compound and Compound (I). The vulcanized rubber composition of the present invention also exhibits excellent resistance against: various types of fluorocarbons such as HFC (e.g., R-134a, R-32, R-125, R-143a, R-407C, R-404A, and R-507), HCFC (e.g., R-22, and R-123) and CFC (e.g., R-11 and R-12); various types of refrigerating machine oil such as ester oil, polyalkylene glycol oil, ether oil, polycarbonate oil, paraffin- and naphthene-based mineral oils, alkyl benzene, poly-α-olefin and the like; and mixtures thereof.

Such effects are remarkable particularly in the epoxy compound-containing vulcanized rubber composition of the present invention. In addition, such a type of the inventive composition is excellent in water resistance, solvent resistance, electric characteristics, mechanical characteristics, adhesive property and heat resistance in comparison with other vulcanized rubber compositions which do not contain an epoxy compound.

Though the present invention is not restricted by a specific theory, deactivation of impurities contained in the nitrile based material rubber by the epoxy compound and/or Compound (I) can be considered as a reason for the exertion of the effects of the present invention. Nitrile based rubber contains small amounts of soap, coagulating agent, iron- or cobalt-containing metal catalyst and the like, which remained after their use in polymerization and hydrogenation, and exudation of such impurities into a refrigerating machine oil may cause deterioration of the refrigerating machine oil or restrain crosslinking of the rubber. When crosslinking is restrained, resistance of a vulcanized rubber composition against fluorocarbons and refrigerating machine oil is reduced. On the other hand, in the case of a vulcanized rubber composition to which an epoxy compound and/or Compound (I) is added in accordance with the present invention, it seems that such impurities are deactivated through their reaction with the epoxy compound or an aluminum complex, namely Compound (I), so that the rubber composition is fully crosslinked and shows high resistance against fluorocarbons and refrigerated machine oil, and deterioration of refrigerating machine oil does not occur because of there is no exudation of the impurities as such into refrigerating machine oil. Among epoxy compounds, a monofunctional epoxy compound or a glycidyl ether type epoxy compound is most effective, and a reason for this may be that, since these compounds have a terminal group other than the epoxy group or have a stable and relatively high polarity ether bond in the molecule, reaction products of the epoxy group with impurities are apt to be entrapped into the nitrile rubber through such terminal and intramolecular moieties. Particularly, when the aforementioned epoxy compound has an alkyl group (especially a branched alkyl group) or an alkenyl group or has an epoxy equivalent of 170 or more, reaction products of the epoxy group with impurities will be easily entrapped in the nitrile rubber through the hydrocarbon radicals and the like. In addition, when refrigerating machine oil, particularly ester type refrigerating machine oil, is deteriorated, it forms an acid such as carboxylic acid, and the formed acid further accelerates deterioration of the refrigerating machine oil. However, in the use of the vulcanized rubber composition of the present invention, it is considered that since the epoxy groups react with an acid to deactivate the acid, the accelerated deterioration of the refrigerating machine oil can be prevented.

In addition to the aforementioned components, the vulcanized rubber composition of the present invention may further contain carbon black such as SAF (particle size, about 11 to 19 nm), ISAF (particle size, about 20 to 25 nm), HAF (particle size, about 26 to 30 nm), FF (particle size, about 31 to 39 nm), FEF (particle size, about 40 to 48 nm), GPF (particle size, about 49 to 60 nm), SRF (particle size, about 61 to 100 nm), FT (particle size, about 101 to 200 nm), and MT (particle size, about 201 to 500 nm). In this connection, each of the designations SAF to MT represents particle size class in the production method. An age resistor such as an antiozonant and an antioxidant may also be blended. Examples of such agents include 6-ethoxy-1,2-dihydro-2,2,4-trimethylquinoline, phenyl-1-naphthylamine, alkylated diphenylamine, p-(p-toluenesulfonylamide)-diphenylamine, N,N'-di-2-naphthyl-p-phenylenediamine, α-methylbenzylphenol, N,N'-diphenyl-p-phenylenediamine, 2,6-di-tert-butyl-4-methylphenol, 4,4'-bis(α,α-dimethylbenzyl)diphenylamine,4,4'-thiobis(3-methyl-6-tert-butylphenol), a 2,2,4-trimethyl-1,2-dihydroquinoline polymer, a reaction product of diphenylamine with acetone, 2,5-di-tert-butylhydroquinone, 2-mercaptobenzimidazole, 2-mercaptomethylbenzimidazole, zinc salt of 2-mercaptobenzimidazole, nickel dibutyldithiocarbamate, tributylthiourea, tris(nonylphenyl)phosphite, dilauryl thiodipropionate and the like.

In addition, a coagent for peroxide crosslinking such as triallyl isocyanulate, ethylene glycol dimethacrylate, trimethylolpropane trimethacrylate, polyfunctional methacrylate monomer, polyhydric alcohol (meth)acrylate and the like may also be blended.

In addition to the above components, the vulcanized rubber composition of the present invention may contain various conventionally used additives for rubber composition use. Examples thereof include a reinforcing agent such as fine silica; a filler such as talc, clay, graphite, calcium silicate, calcium carbonate, and barium sulfate; and a reinforcing fiber such as aramide fiber, carbon fiber, and glass fiber, a tackifier, a plasticizer, a coloring agent, a processing aid and the like.

Process for the production of the vulcanized rubber composition of the present invention is not particularly limited, and it can be produced by conventionally used rubber kneading and vulcanization. For example, the process may be effected by kneading the necessary components using an open roller, a Banbury mixer, a press kneader, an extruder or the like and then carrying out vulcanization into a desired shape by the aforementioned method.

The vulcanized rubber composition of the present invention hardly accelerates deterioration of refrigerating machine oil, while showing excellent resistance against fluorocarbons and refrigerating machine oil. As a consequence, the vulcanized rubber composition of the present invention is suited for use in refrigerating machines such as refrigerators and air conditioners, particularly as the molding material for rubber parts (e.g., O-rings, sealing sleeves, packings, hoses, and tubes) which are used in the compressor of a refrigerating machine. Also, since the vulcanized rubber composition of the present invention is excellent in water resistance, solvent resistance, electric characteristics, mechanical characteristics, adhesive property and heat resistance in comparison with conventional vulcanized rubber compositions which do not contain the epoxy compound and Compound (I), the inventive composition is also suited for use as an electric wire covering material, a composite material for metal and rubber, an adhesive material and the like.

The present invention also includes moldings obtained from the aforementioned vulcanized rubber composition, such as O-rings, sealing sleeves, packings, hoses, tubes and the like. Such vulcanized moldings hardly accelerate deterioration of refrigerating machine oil. They also show excellent resistance against: various types of fluorocarbons such as HFC (e.g., R-134a, R-32, R-125, R-143a, R-407C, R-404A, and R-507), HCFC (e.g., R-22 and R-123) and CFR (e.g., R-11 and R-12); various types of refrigerating machine oil such as ester oil, polyalkylene glycol oil, ether oil, polycarbonate oil, paraffin- and naphthene-based mineral oils, alkyl benzene, poly-α-olefin and the like; and mixtures thereof. The vulcanized moldings of the present invention are particularly advantageous when used in refrigerating machines such as refrigerators and air conditioners in which ester oil, which is apt to be hydrolyzed, is used.

EXAMPLES

Examples of the present invention are given below by way of illustration and not by way of limitation.

Rubber samples of various formulations as shown in Tables 1 to 7 were prepared to carry out immersion test using fluorocarbons and refrigerating machine oil. In this connection, units of each formulation shown in the tables is part(s) by weight.

Each rubber sample was prepared by kneading respective rubber with formulating agents using an open roller, heating the mixture at 170° C. for 10 minutes using a hot press to form a sheet and then subjecting the sheet to post cure at 150° C. for 4 hours in an oven.

Using three dumbbell test pieces of JIS No. 6 which have been cut out from each of the thus prepared vulcanized rubber sheets, an immersion test was carried out in accordance with the procedure of JIS K6258. That is, the immersion test was carried out by putting a mixture solution of R-407C +ester oil (50 ml+50 ml, hereinafter referred to as "R-407C system") or a mixture solution of R-22+mineral oil (50 ml+50 ml, hereinafter referred to as "R-22 system") and the test pieces into a pressure vessel and keeping them at 125° C. or 150° C. for 22 hours. The immersion temperatures employed in inventive and comparative examples are shown in Tables 1 to 7.

After completion of the immersion, total acid number of the oil and changes in the volume, weight, hardness and tensile strength of the vulcanized rubber caused by the immersion were measured, and conditions of the test pieces after immersion (degree of foaming and swelling) were observed. Respective results are shown in Tables 1 to 7.

Total acid number was measured in accordance with the procedure of JIS K3504. Volume change by the immersion was calculated in accordance with the procedure of JIS K6258, based on weights and specific gravities of each sample piece before and after its immersion. Changes in hardness and tensile strength in the immersion test were calculated from the results of measurements carried out in accordance with the procedures of JIS K6253 and K6251. Conditions of the refrigerating machine oil after immersion were observed with the naked eye.

The criteria are as follows.

A: transparent

B: slightly turbid

C: considerably turbid

Conditions of test pieces after immersion were observed with the naked eye and, by comparing the results with the conditions before immersion, evaluation was conducted according to the following criteria.

A: Forming and swelling were not found.

B: Forming was not found but swelling was slightly found.

C: Forming and swelling were slightly found.

D: Forming and swelling were evident.

TABLE 1

(Results of Immersion Test)

| Examples | Example 1 | Comparative Example 1 | Example 2 | Example 3 | Comparative Example 2 | Example 4 | Example 5 | Comparative Example 3 | Example 6 | Comparative Example 4 | Example 7 | Comparative Example 5 |
|---|---|---|---|---|---|---|---|---|---|---|---|---|
| Formulation | | | | | | | | | | | | |
| HNBR-1 | 100.0 | 100.0 | 100.0 | — | — | — | 100.0 | 100.0 | 100.0 | 100.0 | — | — |
| HNBR-2 | — | — | — | 100.0 | 100.0 | 100.0 | — | — | — | — | 100.0 | 100.0 |
| Liquid NBR | — | — | — | — | — | — | — | — | — | — | — | — |
| FT-carbon | 60.0 | 60.0 | 60.0 | — | — | — | — | — | — | — | — | — |
| SRF-carbon | — | — | — | 50.0 | 50.0 | 50.0 | 65.0 | 65.0 | — | — | 60.0 | 60.0 |
| MT-carbon | — | — | — | — | — | — | — | — | — | — | — | — |
| FEF-carbon | — | — | — | — | — | — | — | — | 80.0 | 80.0 | 30.0 | 30.0 |
| BFGE | 5.0 | — | — | 5.0 | — | — | 10.0 | — | 5.0 | — | — | — |
| EHGE | — | — | — | — | — | — | — | — | — | — | 10.0 | — |
| OBPA | — | — | 0.5 | — | — | 1.0 | — | — | — | — | — | — |
| Triallyl isocyanurate | — | — | — | 2.0 | 2.0 | 2.0 | 4.0 | 4.0 | — | — | 4.0 | 4.0 |
| TMP | — | — | — | — | — | — | — | — | 2.0 | 2.0 | — | — |
| Process oil | — | — | — | — | — | — | — | — | 30.0 | 30.0 | — | — |
| Peroxide-1 | 3.0 | 3.0 | 3.0 | 5.0 | 5.0 | 5.0 | — | — | — | — | — | — |
| Peroxide-2 | — | — | — | — | — | — | 3.0 | 3.0 | — | — | 3.0 | 3.0 |
| Peroxide-3 | — | — | — | — | — | — | — | — | 2.0 | 2.0 | — | — |
| Age resistor | — | — | — | 1.0 | 1.0 | 1.0 | — | — | 1.0 | 1.0 | 1.5 | 1.5 |
| After Immersion in R-407C System | | | | | | | | | | | | |
| Immersion temperature (° C.) | 125 | 125 | 125 | 150 | 150 | 150 | 125 | 125 | 150 | 150 | 125 | 125 |
| Total acid number (mg KOH/g) | 0.04 | 0.09 | 0.04 | 0.04 | 0.09 | 0.04 | 0.03 | 0.07 | 0.05 | 0.13 | 0.04 | 0.09 |
| Volume change rate (%) | 7.4 | 14.6 | 7.2 | 7.6 | 15.8 | 7.6 | 7.4 | 15.4 | 12.6 | 20.8 | 7.3 | 13.4 |
| Hardness change (point) | −6 | −10 | −6 | −7 | −11 | −7 | −6 | −12 | −10 | −14 | −8 | −11 |
| Change rate of tensile strength (%) | −12 | −50 | −13 | −11 | −53 | −11 | −11 | −52 | −45 | −56 | −32 | −52 |

TABLE 1-continued (Results of Immersion Test)

| Examples | Example 1 | Comparative Example 1 | Example 2 | Example 3 | Comparative Example 2 | Example 4 | Example 5 | Comparative Example 3 | Example 6 | Comparative Example 4 | Example 7 | Comparative Example 5 |
|---|---|---|---|---|---|---|---|---|---|---|---|---|
| Condition of refrigerating machine oil | A | A | A | A | A | A | A | A | A | A | A | A |
| Condition of test pieces | A | C | A | A | D | B | A | B | A | D | A | B |
| After Immersion in R-22 System | | | | | | | | | | | | |
| Immersion temperature (° C.) | 125 | 125 | 125 | 150 | 150 | 150 | 125 | 125 | 150 | 150 | 150 | 150 |
| Total acid number (mg KOH/g) | 0.05 | 0.10 | 0.06 | 0.06 | 0.12 | 0.06 | 0.04 | 0.10 | 0.06 | 0.14 | 0.04 | 0.10 |
| Volume change ratio (%) | 8.0 | 20.3 | 8.2 | 10.3 | 24.2 | 10.3 | 15.8 | 17.5 | 18.6 | 28.6 | 9.1 | 14.7 |
| Hardness change (point) | −6 | −9 | −7 | −8 | −13 | −8 | −11 | −33 | −11 | −16 | −9 | −13 |
| Change rate of tensile strength (%) | −25 | −59 | −26 | −32 | −61 | −32 | −47 | −71 | −54 | −74 | −38 | −59 |
| Condition of refrigerating machine oil | A | A | A | A | A | A | A | A | A | A | A | A |
| Condition of test pieces | A | C | A | A | D | B | A | C | A | D | A | B |

TABLE 2

(Results of Immersion Test)

| Examples | Example 8 | Comparative Example 6 | Example 9 | Example 10 | Comparative Example 7 | Example 11 | Comparative Example 8 | Example 12 | Comparative Example 9 | Example 13 | Comparative Example 10 |
|---|---|---|---|---|---|---|---|---|---|---|---|
| Formulation | | | | | | | | | | | |
| HNBR-1 | — | — | — | 100.0 | 100.0 | — | — | — | — | — | — |
| HNBR-2 | 100.0 | 100.0 | 110.0 | — | — | 100.0 | 100.0 | 100.0 | 100.0 | 100.0 | 100.0 |
| Liquid NBR | — | — | — | 20.0 | 20.0 | — | — | — | — | — | — |
| FT-carbon | — | — | — | — | — | 65.0 | 65.0 | — | — | — | — |
| SRF-carbon | 85.0 | 85.0 | — | — | — | — | — | — | — | — | — |
| GPF-carbon | — | — | 80.0 | — | — | — | — | — | — | — | — |
| FEF-carbon | — | — | — | — | — | — | — | — | — | 50.0 | 50.0 |
| HAF-carbon | — | — | — | 60.0 | 60.0 | — | — | — | — | 50.0 | 50.0 |
| White carbon | — | — | — | — | — | — | — | 50.0 | 50.0 | — | — |
| Barium sulfate | — | — | — | — | — | — | — | — | — | 50.0 | 50.0 |
| BFGE | — | — | — | — | — | 20.0 | — | 10.0 | — | 10.0 | — |
| ECC | — | — | — | 5.0 | — | — | — | — | — | — | — |
| AGE | 10.0 | — | — | — | — | — | — | — | — | — | — |
| RGE | — | — | 10.0 | — | — | — | — | — | — | — | — |
| Triallyl isocyanurate | 4.0 | 4.0 | 4.0 | — | — | — | — | 4.0 | 4.0 | 4.0 | 4.0 |
| TMP | — | — | — | 2.0 | 2.0 | 2.0 | 2.0 | — | — | — | — |
| Peroxide-1 | — | — | — | — | — | 5.0 | 5.0 | — | — | — | — |
| Peroxide-2 | 3.0 | 3.0 | 3.0 | 3.0 | 3.0 | — | — | 3.0 | 3.0 | 3.0 | 3.0 |
| Age resistor | 1.5 | 1.5 | 1.5 | 1.5 | 1.5 | 2.0 | 2.0 | 1.5 | 1.5 | 1.5 | 1.5 |
| After Immersion in R-407C System | | | | | | | | | | | |
| Immersion temperature (° C.) | 125 | 125 | 125 | 125 | 125 | 125 | 125 | 125 | 125 | 125 | 125 |
| Total acid number (mg KOH/g) | 0.04 | 0.09 | 0.03 | 0.04 | 0.07 | 0.03 | 0.10 | 0.04 | 0.09 | 0.04 | 0.08 |
| Volume change rate (%) | 10.3 | 41.5 | 9.8 | 9.9 | 12.7 | 9.7 | 23.0 | 8.9 | 14.9 | 9.7 | 13.8 |
| Hardness change (point) | −11 | −14 | −8 | −8 | −10 | −9 | −19 | −8 | −10 | −9 | −15 |
| Change rate of tensile | −21 | −76 | −34 | −37 | −41 | −36 | −63 | −47 | −55 | −28 | −40 |

TABLE 2-continued (Results of Immersion Test)

| Examples | Example 8 | Comparative Example 6 | Example 9 | Example 10 | Comparative Example 7 | Example 11 | Comparative Example 8 | Example 12 | Comparative Example 9 | Example 13 | Comparative Example 10 |
|---|---|---|---|---|---|---|---|---|---|---|---|
| strength (%) | | | | | | | | | | | |
| Condition of refrigerating machine oil | A | A | A | A | A | A | A | A | A | A | A |
| Condition of test pieces | A | D | A | A | D | A | D | A | C | A | C |
| After Immersion in R-22 System | | | | | | | | | | | |
| Immersion temperature (° C.) | 125 | 125 | 125 | 125 | 125 | 150 | 150 | 125 | 125 | 125 | 125 |
| Total acid number (mg KOH/g) | 0.05 | 0.12 | 0.05 | 0.06 | 0.09 | 0.05 | 0.14 | 0.06 | 0.10 | 0.04 | 0.10 |
| Volume change ratio (%) | 8.0 | 32.5 | 10.2 | 13.2 | 16.4 | 13.5 | 21.3 | 12.1 | 18.6 | 8.9 | 10.6 |
| Hardness change (point) | −8 | −10 | −9 | −10 | −16 | −9 | −15 | −9 | −18 | −9 | −12 |
| Change rate of tensile strength (%) | −7 | −76 | −46 | −53 | −75 | −41 | −64 | −39 | −83 | −39 | −53 |
| Condition of refrigerating machine oil | A | A | A | A | A | A | A | A | A | A | A |
| Condition of test pieces | A | D | A | A | D | A | D | A | D | A | D |

TABLE 3

(Results of Immersion Test)

| Examples | Example 14 | Example 15 | Example 16 | Example 17 | Example 18 | Example 19 | Example 20 | Example 21 | Example 22 | Comparative Example 11 |
|---|---|---|---|---|---|---|---|---|---|---|
| Formulation | | | | | | | | | | |
| HNBR-2 | 100.0 | 100.0 | 100.0 | 100.0 | 100.0 | 100.0 | 100.0 | 100.0 | 100.0 | 100.0 |
| FT-carbon | 30.0 | 30.0 | 30.0 | 30.0 | 30.0 | 30.0 | 30.0 | 30.0 | 30.0 | 30.0 |
| FEF-carbon | 30.0 | 30.0 | 30.0 | 30.0 | 30.0 | 30.0 | 30.0 | 30.0 | 30.0 | 30.0 |
| BFGE | 10.0 | — | — | — | — | — | — | — | — | — |
| PGE | — | 10.0 | — | — | — | — | — | — | — | — |
| EHGE | — | — | 10.0 | — | — | — | — | — | — | — |
| RGE | — | — | — | 10.0 | — | — | — | — | — | — |
| AGE | — | — | — | — | 10.0 | — | — | — | — | — |
| PGPEOE | — | — | — | — | — | 10.0 | — | — | — | — |
| BFAGE | — | — | — | — | — | — | 10.0 | — | — | — |
| EB | — | — | — | — | — | — | — | 10.0 | — | — |
| ECC | — | — | — | — | — | — | — | — | 10.0 | — |
| TMP | 2.0 | 2.0 | 2.0 | 2.0 | 2.0 | 2.0 | 2.0 | 2.0 | 2.0 | 2.0 |
| Peroxide-1 | 3.0 | 3.0 | 3.0 | 3.0 | 3.0 | 3.0 | 3.0 | 3.0 | 3.0 | 3.0 |
| Age resistor | 1.5 | 1.5 | 1.5 | 1.5 | 1.5 | 1.5 | 1.5 | 1.5 | 1.5 | 1.5 |
| After Immersion in R-407C System | | | | | | | | | | |
| Immersion temperature (° C.) | 125 | 125 | 125 | 125 | 125 | 125 | 125 | 125 | 125 | 125 |
| Total acid number (mg KOH/g) | 0.04 | 0.03 | 0.04 | 0.03 | 0.03 | 0.05 | 0.03 | 0.05 | 0.06 | 0.09 |
| Volume change rate (%) | 8.9 | 9.0 | 8.8 | 8.1 | 7.6 | 12.7 | 6.6 | 10.9 | 14.9 | 18.2 |
| Hardness change (point) | −12 | −13 | −10 | −8 | −7 | −10 | −10 | −8 | −10 | −14 |
| Change rate of tensile strength (%) | −28 | −8 | −19 | −30 | −19 | −36 | −20 | −45 | −55 | −63 |
| Condition of refrigerating machine oil | A | A | A | A | A | A | C | A | A | A |
| Condition of test pieces | A | A | A | A | A | A | A | B | B | C |
| After Immersion in R-22 System | | | | | | | | | | |
| Immersion temperature | 125 | 125 | 125 | 125 | 125 | 125 | 125 | 125 | 125 | 125 |

TABLE 3-continued (Results of Immersion Test)

| Examples | Example 14 | Example 15 | Example 16 | Example 17 | Example 18 | Example 19 | Example 20 | Example 21 | Example 22 | Comparative Example 11 |
|---|---|---|---|---|---|---|---|---|---|---|
| (° C.) | | | | | | | | | | |
| Total acid number (mg KOH/g) | 0.05 | 0.05 | 0.04 | 0.04 | 0.04 | 0.05 | 0.04 | 0.06 | 0.06 | 0.10 |
| Volume change ratio (%) | 14.2 | 11.6 | 13.0 | 4.1 | 9.7 | 16.4 | 6.2 | 18.6 | 18.2 | 20.6 |
| Hardness change (point) | −16 | −13 | −14 | −10 | −9 | −13 | −12 | −15 | −17 | −18 |
| Change rate of tensile strength (%) | −30 | −42 | −25 | −38 | −36 | −41 | −17 | −64 | −62 | −83 |
| Condition of refrigerating machine oil | A | B | A | A | A | B | B | A | B | A |
| Condition of test pieces | A | A | A | A | A | A | A | B | B | D |

TABLE 4

(Results of Immersion Test)

| Examples | Example 23 | Comparative Example 12 | Example 24 | Comparative Example 13 | Example 25 | Comparative Example 14 | Example 26 | Comparative Example 15 | Example 27 | Comparative Example 16 | Example 28 |
|---|---|---|---|---|---|---|---|---|---|---|---|
| Formulation | | | | | | | | | | | |
| NBR | 100.0 | 100.0 | — | — | — | — | — | — | — | — | — |
| CR | — | — | 100.0 | 100.0 | — | — | — | — | — | — | — |
| EPDM | — | — | — | — | 100.0 | 100.0 | — | — | — | — | — |
| HNBR-1 | — | — | — | — | — | — | 50.0 | 50.0 | 100.0 | 100.0 | 100.0 |
| CIPE | — | — | — | — | — | — | 50.0 | 50.0 | — | — | — |
| SRF-carbon | — | — | 30.0 | 30.0 | — | — | — | — | 40.0 | 40.0 | 40.0 |
| MT-carbon | — | — | 50.0 | 50.0 | — | — | — | — | 40.0 | 40.0 | 40.0 |
| FEF-carbon | 50.0 | 50.0 | — | — | 30.0 | 30.0 | 30.0 | 30.0 | — | — | — |
| RGE | 10.0 | — | — | — | 10.0 | — | — | — | 5.0 | 5.0 | 0.0 |
| BFAGE | — | — | 10.0 | — | — | — | 10.0 | — | — | — | — |
| Zinc oxide | — | — | 5.0 | 5.0 | 5.0 | 5.0 | — | — | — | — | — |
| Magnesium oxide | — | — | 4.0 | 4.0 | — | — | 4.0 | 4.0 | — | — | — |
| OBPA | — | — | — | — | — | — | — | — | 0.5 | — | — |
| Triallyl isocyanurate | 4.0 | 4.0 | — | — | — | — | 4.0 | 4.0 | — | — | — |
| TMP | — | — | — | — | 2.0 | 2.0 | — | — | 2.0 | 2.0 | 2.0 |
| Peroxide-1 | 3.0 | 3.0 | — | — | 3.0 | 3.0 | 3.0 | 3.0 | 3.0 | 3.0 | 3.0 |
| Age resistor | 1.5 | 1.5 | — | — | 4.0 | 4.0 | 1.5 | 1.5 | 1.5 | 1.5 | 1.5 |
| After Immersion in R-407C System | | | | | | | | | | | |
| Immersion temperature (° C.) | 125 | 125 | 125 | 125 | 125 | 125 | 150 | 150 | 150 | 150 | 150 |
| Total acid number (mg KOH/g) | 0.03 | 0.13 | 0.05 | 0.09 | 0.04 | 0.08 | 0.06 | 0.15 | 0.03 | 0.04 | 0.10 |
| Volume change rate (%) | 12.3 | 28.7 | 7.6 | 8.7 | 7.4 | 10.4 | 11.2 | 11.6 | 9.2 | 9.6 | 10.8 |
| Hardness change (point) | −9 | −19 | −8 | −16 | −4 | −3 | −10 | −10 | −6 | −6 | −7 |
| Change rate of tensile strength (%) | −39 | −75 | −11 | −16 | −17 | −24 | −25 | −27 | −32 | −39 | −43 |
| Condition of refrigerating machine oil | A | A | A | A | A | A | A | A | A | A | A |
| Condition of test pieces | A | D | A | B | A | B | A | A | A | A | B |
| After Immersion in R-22 System | | | | | | | | | | | |
| Immersion temperature (° C.) | 150 | 150 | 150 | 150 | 150 | 150 | 150 | 150 | 150 | 150 | 150 |
| Total acid number (mg KOH/g) | 0.04 | 0.21 | 0.08 | 0.14 | 0.05 | 0.07 | 0.07 | 0.16 | 0.04 | 0.04 | 0.09 |
| Volume change | 14.2 | 34.8 | 11.2 | 32.4 | 23.1 | 57.7 | 19.7 | 27.6 | 12.5 | 13.6 | 15.2 |

TABLE 4-continued (Results of Immersion Test)

| Examples | Example 23 | Comparative Example 12 | Example 24 | Comparative Example 13 | Example 25 | Comparative Example 14 | Example 26 | Comparative Example 15 | Example 27 | Comparative Example 16 | Example 28 |
|---|---|---|---|---|---|---|---|---|---|---|---|
| rate (%) | | | | | | | | | | | |
| Hardness change (point) | −10 | −21 | −9 | −13 | −11 | −14 | −11 | −13 | −8 | −9 | −10 |
| Change rate of tensile strength (%) | −38 | −69 | −37 | −71 | −51 | −83 | −29 | −36 | −34 | −33 | −42 |
| Condition of refrigerating machine oil | A | A | A | A | A | A | A | A | A | A | A |
| Condition of test pieces | A | D | A | D | B | D | A | B | A | A | B |

TABLE 5

(Results of Immersion Test)

| Examples | Example 29 | Comparative Example 17 | Example 30 | Comparative Example 18 | Example 31 | Comparative Example 9 | Example 32 | Comparative Example 19 | Example 33 | Comparative Example 4 | Example 34 | Comparative Example 12 |
|---|---|---|---|---|---|---|---|---|---|---|---|---|
| Formulation | | | | | | | | | | | | |
| HNBR-1 | — | — | — | — | — | — | — | — | 100.0 | 100.0 | — | — |
| HNBR-2 | 100.0 | 100.0 | 100.0 | 100.0 | 100.0 | 100.0 | 100.0 | 100.0 | — | — | — | — |
| NBR | — | — | — | — | — | — | — | — | — | — | 100.0 | 100.0 |
| Liquid NBR | — | — | 10.0 | 10.0 | — | — | 10.0 | 10.0 | — | — | — | — |
| FT-carbon | — | — | — | — | — | — | — | — | — | — | — | — |
| SRF-carbon | — | — | — | — | — | — | — | — | — | — | — | — |
| MT-carbon | — | — | — | — | — | — | 100.0 | 100.0 | — | — | — | — |
| FEF-carbon | 50.0 | 50.0 | 50.0 | 50.0 | — | — | — | — | 80.0 | 80.0 | 50.0 | 50.0 |
| White carbon | — | — | — | — | 50.0 | 50.0 | — | — | — | — | — | — |
| OBPA | 1.5 | — | 1.5 | — | 1.5 | — | 0.5 | — | 2.0 | — | 1.5 | — |
| Triallyl isocyanurate | 4.0 | 4.0 | 4.0 | 4.0 | 4.0 | 4.0 | 4.0 | 4.0 | — | — | 4.0 | 4.0 |
| TMP | — | — | — | — | — | — | — | — | 2.0 | 2.0 | — | — |
| Process oil | — | — | — | — | — | — | — | — | 30.0 | 30.0 | — | — |
| Peroxide-1 | 3.0 | 3.0 | 3.0 | 3.0 | 3.0 | 3.0 | — | — | — | — | 3.0 | 3.0 |
| Peroxide-2 | — | — | — | — | — | — | 3.0 | 3.0 | — | — | — | — |
| Peroxide-3 | — | — | — | — | — | — | — | — | 2.0 | 2.0 | — | — |
| Age resistor | 1.5 | 1.5 | 1.5 | 1.5 | 1.5 | 1.5 | — | — | 1.0 | 1.0 | 1.5 | 1.5 |
| After Immersion in R-407C System | | | | | | | | | | | | |
| Immersion temperature (° C.) | 125 | 125 | 125 | 125 | 125 | 125 | 125 | 125 | 150 | 150 | 125 | 125 |
| Total acid number (mg KOH/g) | 0.06 | 0.09 | 0.06 | 0.10 | 0.06 | 0.09 | 0.04 | 0.10 | 0.09 | 0.13 | 0.09 | 0.13 |
| Volume change rate (%) | 18.2 | 41.5 | 11.2 | 40.2 | 10.3 | 14.9 | 9.2 | 9.6 | 15.7 | 20.8 | 18.4 | 28.7 |
| Hardness change (point) | −12 | −14 | −14 | −24 | −8 | −10 | −13 | −15 | −12 | −14 | −12 | −19 |
| Change rate of tensile strength (%) | −62 | −76 | −21 | −41 | −53 | −55 | −23 | −54 | −51 | −56 | −55 | −75 |
| Condition of test pieces | B | D | B | D | A | C | A | C | B | D | B | D |
| After Immersion in R-22 System | | | | | | | | | | | | |
| Immersion temperature (° C.) | 125 | 125 | 125 | 125 | 125 | 125 | 150 | 150 | 150 | 150 | 150 | 150 |
| Total acid number (mg KOH/g) | 0.09 | 0.12 | 0.06 | 0.14 | 0.07 | 0.10 | 0.08 | 0.12 | 0.10 | 0.14 | 0.11 | 0.21 |
| Volume change ratio (%) | 15.6 | 32.5 | 8.0 | 20.6 | 13.6 | 18.6 | 5.7 | 10.8 | 21.5 | 28.6 | 20.4 | 34.8 |

TABLE 5-continued (Results of Immersion Test)

| Examples | Example 29 | Comparative Example 17 | Example 30 | Comparative Example 18 | Example 31 | Comparative Example 9 | Example 32 | Comparative Example 19 | Example 33 | Comparative Example 4 | Example 34 | Comparative Example 12 |
|---|---|---|---|---|---|---|---|---|---|---|---|---|
| Hardness change (point) | −8 | −10 | −7 | −20 | −11 | −18 | −12 | −10 | −13 | −16 | −13 | −21 |
| Change rate of tensile strength (%) | −47 | −76 | −5 | −61 | −65 | −83 | −42 | −57 | −62 | −74 | −52 | −69 |
| Condition of test pieces | B | D | A | D | B | D | A | C | B | D | B | D |

TABLE 6

(Results of Immersion Test)

| Examples | Example 35 | Comparative Example 20 | Example 36 | Example 37 | Comparative Example 21 | Example 38 | Comparative Example 22 |
|---|---|---|---|---|---|---|---|
| Formulation | | | | | | | |
| HNBR-1 | 100.0 | 100.0 | 100.0 | 100.0 | 100.0 | 100.0 | 100.0 |
| FEF-carbon | 50.0 | 50.0 | 50.0 | 50.0 | 50.0 | 50.0 | 50.0 |
| OBPA | — | — | — | 0.5 | — | — | — |
| ABEA | 1.0 | — | — | — | — | 0.5 | — |
| AIEA | — | — | 1.0 | — | — | — | — |
| RGE | — | — | — | — | — | 5.0 | — |
| Triallyl isocyanurate | 4.0 | 4.0 | 4.0 | — | — | — | — |
| Peroxide-2 | 3.0 | 3.0 | 3.0 | — | — | — | — |
| Sulfur | — | — | — | 2.0 | 2.0 | — | — |
| 2-Mercaptobenzothiazole | — | — | — | 2.0 | 2.0 | — | — |
| Tetraethylthiuram disulfide | — | — | — | — | — | 4.0 | 4.0 |
| Age resistor | 1.5 | 1.5 | 1.5 | 1.5 | 1.5 | 1.5 | 1.5 |
| After Immersion in R-407C System | | | | | | | |
| Immersion temperature (° C.) | 125 | 125 | 125 | 125 | 125 | 125 | 125 |
| Total acid number (mg KOH/g) | 0.05 | 0.09 | 0.04 | 0.37 | 0.59 | 0.32 | 0.43 |
| Volume change rate (%) | 7.4 | 13.9 | 7.1 | 11.2 | 12.5 | 13.4 | 15.1 |
| Hardness change (point) | −7 | −11 | −6 | −10 | −11 | −10 | −12 |
| Change rate of tensile strength (%) | −17 | −52 | −13 | −41 | −58 | −51 | −67 |
| Condition of test pieces | A | C | A | A | C | B | C |
| After Immersion in R-22 System | | | | | | | |
| Immersion temperature (° C.) | 125 | 125 | 125 | 125 | 125 | 125 | 125 |
| Total acid number (mg KOH/g) | 0.05 | 0.11 | 0.06 | 0.18 | 0.37 | 0.14 | 0.32 |
| Volume change ratio (%) | 7.9 | 19.3 | 9.7 | 13.5 | 14.2 | 15.5 | 18.9 |
| Hardness change (point) | −8 | −10 | −8 | −10 | −10 | −12 | −15 |
| Change rate of tensile strength (%) | −27 | −65 | −29 | −48 | −52 | −53 | −59 |
| Condition of test pieces | A | C | A | B | C | B | C |

TABLE 7

| Examples | Example 39 | Example 40 | Example 41 | Example 42 | Example 43 | Example 44 |
|---|---|---|---|---|---|---|
| Formulation | | | | | | |
| HNBR-1 | 100.0 | — | 100.0 | — | — | — |
| HNBR-2 | — | 100.0 | — | 100.0 | 100.0 | 100.0 |
| MT-carbon | — | 100.0 | — | — | — | — |
| FT-carbon | — | — | — | 65.0 | — | — |
| SRF-carbon | 65.0 | — | — | — | — | — |
| FEF-carbon | — | — | — | — | — | 50.0 |
| HAF-carbon | — | — | 60.0 | — | — | — |
| White carbon | — | — | — | — | 50.0 | — |
| Barium sulfate | — | — | — | — | — | 50.0 |
| OBPA | 1.8 | 0.5 | 0.5 | 1.5 | 1.5 | 1.5 |
| Triallyl isocyanurate | 4.0 | 4.0 | — | — | 4.0 | 4.0 |
| TMP | — | — | 2.0 | 2.0 | — | — |
| Peroxide-1 | — | — | — | 5.0 | 3.0 | 3.0 |
| Peroxide-2 | 3.0 | 3.0 | 3.0 | — | — | — |
| Age resistor | — | — | 1.5 | 2.0 | 1.5 | 1.5 |

TABLE 7-continued

| Examples | Example 39 | Example 40 | Example 41 | Example 42 | Example 43 | Example 44 |
| --- | --- | --- | --- | --- | --- | --- |
| After Immersion in R-407C System | | | | | | |
| Immersion temperature (° C.) | 125 | 125 | 125 | 125 | 125 | 125 |
| Total acid number (mg KOH/g) | 0.05 | 0.06 | 0.05 | 0.06 | 0.06 | 0.05 |
| Volume change rate (%) | 7.8 | 9.4 | 10.8 | 12.6 | 10.3 | 9.7 |
| Hardness change (point) | −7 | −6 | −9 | −10 | −8 | −8 |
| Change rate of tensile strength (%) | −11 | −50 | −37 | −45 | −53 | −27 |
| Condition of test pieces | A | A | B | B | A | A |
| After Immersion in R-22 System | | | | | | |
| Immersion temperature (° C.) | 125 | 150 | 125 | 150 | 125 | 125 |
| Total acid number (mg KOH/g) | 0.09 | 0.08 | 0.07 | 0.09 | 0.07 | 0.06 |
| Volume change ratio (%) | 17.7 | 12.6 | 14.8 | 15.7 | 13.6 | 8.6 |
| Hardness change (point) | −18 | −9 | −10 | −10 | −11 | −9 |
| Change rate of tensile strength (%) | −57 | −5 | −57 | −51 | −65 | −42 |
| Condition of test pieces | B | A | B | B | B | A |

Abbreviations:
NHBR-1: nitrile content: 44%, iodine value: 10%, Mooney viscosity: 85
HNBR-2: nitrile content: 44%, iodine value: 25%, Mooney viscosity: 78
BFGE: p-tert-butylphenyl glycidyl ether, epoxy equivalent: 226, molecular weight: 206, specific gravity: 1.03
EHGE: 2-ethylhexyl glycidyl ether, epoxy equivalent: 186, molecular weight: 186, specific gravity: 0.90
TMP: trimethylolpropanate trimethacrylate
Peroxide-1: dicumyl peroxide
Peroxide-2: α,α'-bis(t-butylperoxy-m-isopropyl)benzene
Peroxide-3: benzoyl peroxide
ECC: 1,2-epoxycyclohexane, epoxy equivalent: 98, molecular weight: 98, specific gravity: 0.97
AGE: allyl glycidyl ether, epoxy equivalent: 117, molecular weight: 117, specific gravity: 0.97
RGE: mixture of dodecyl glycidyl ether and tridecyl glycidyl ether (1:1), epoxy equivalent: 282, average molecular weight: 249, specific gravity: 0.91
PGE: phenyl glycidyl ether, epoxy equivalent: 154, molecular weight: 154, specific gravity: 1.11
PGPEOE: phenyl glycidyl penta(ethyleneoxy)ether, epoxy equivalent: 405, molecular weight: 370, specific gravity: 1.12
PFAGE: biphenyl A diglycidyl ether, epoxy equivalent: 189, molecular weight: 380, specific gravity: 1.17
EB: 1,2-epoxybutane, epoxy equivalent: 72, molecular weight: 72, specific gravity: 0.83
NBR: nitrile content: 43%, Mooney viscosity: 85
CR: no-sulfur modification type, Mooney viscosity: 42–51
EPDM: ethylidenenorbornane-containing EPDM, propylene content: 43%, Mooney viscosity: 45
CIPE: chlorinated polyethylene, chlorine content: 35%, Mooney viscosity: 50
Liquid NBR: Nipol 1312
Age resistor: 4,4'-bid(α,α-dimethylbenzyl)diphenylamine
Process oil: aromatic hydrocarbon oil
Those other than the above abbreviations are the same as in the present specification.

It is evident from the results shown in the above tables that the vulcanized rubber compositions which contain the specific epoxy compound and/or Compound (I) in accordance with the present invention hardly deteriorate refrigerating machine oil, in comparison with other vulcanized rubber compositions which do not contain such compounds, and can show fluorocarbons and refrigerating machine oil resistances which are superior to those of the vulcanized rubber compositions which do not contain such compounds.

Thus, it is apparent that there has been provided, in accordance with the present invention, a vulcanized rubber composition which hardly accelerates deterioration of refrigerating machine oil, such as hydrolysis of ester oil, and which shows excellent resistance against fluorocarbons and refrigerating machine oil. Effect of the present invention is remarkable, because the inventive composition has evidently small. degree of deteriorating refrigerating machine oil in comparison with the conventional vulcanized rubber compositions, particularly when a fact is taken into consideration that there is no prior art rubber having sufficient resistance against new flon and refrigerating machine oil, which is an element that inhibits application of substitute fluorocarbons to refrigerating machines.

While the invention has been described in detail with reference to specific embodiments, it will be apparent to one skilled in the art that various changes and modifications can be made to the invention without departing from its spirit and scope.

What is claimed is:

1. A rubber composition for use with fluorocarbons and/or refrigerating machine oil, said rubber composition consisting essentially of at least one rubber selected from the group consisting of a nitrile group-containing rubber, a chloroprene rubber, and an ethylene propylene rubber as a base and a monofunctional epoxy compound, wherein said monofunctional epoxy compound is mixed in or otherwise incorporated into said base.

2. A rubber composition for use with fluorocarbons and/or refrigerating machine oil, said rubber composition consisting essentially of at least one rubber selected from the group consisting of a nitrile group-containing rubber, a chloroprene rubber, and an ethylene propylene rubber as a base and a glycidyl ether type epoxy compound, wherein said glycidyl ether type epoxy compound is mixed in or otherwise incorporated into said base.

3. A rubber composition for use with fluorocarbons and/or refrigerating machine oil, said rubber composition consisting essentially of at least one rubber selected from the group consisting of a nitrile group-containing rubber, a chloroprene rubber, and an ethylene propylene rubber as a base and a monofunctional glycidyl ether type epoxy compound, wherein said monofunctional glycidyl ether type epoxy compound is mixed in or otherwise incorporated into said base.

4. The rubber composition of claim 1, 2 or 3, wherein the epoxy compound has an alkyl group and/or an alkenyl group.

5. The rubber composition of claim 1, 2, or 3, wherein the epoxy compound has an epoxy equivalent of 100 or more.

6. The rubber composition of claim 1, 2 or 3, wherein the epoxy compound is used in an amount of from 0.1 to 50 parts by weight based on 100 parts by weight of the rubber.

7. The rubber composition of claim 1, 2, or 3, which further comprises a compound represented by formula (I) (Compound (I)):

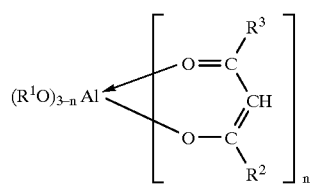

wherein $R^1$ represents a hydrogen atom or an alkyl group, $R^2$ represents an alkyl group or a phenyl group, $R^3$ represents an alkyl group, an alkoxy group or an alkenyloxy group, and n is 1 or 2.

8. The rubber composition of claim 7, wherein $R^1$ is an isopropyl group or a sec-butyl group, $R^2$ is a methyl group, $R^3$ is an ethoxy group or —$OC_{18}H_{35}$, and n is 1.

9. The rubber composition of claim 7, wherein Compound (I) is used in an amount of from 0.01 to 20.0 parts by weight based on 100 parts by weight of the rubber.

10. The rubber composition of claim 1, 2, or 3, wherein the rubber is the nitrile-containing rubber.

11. The rubber composition of claim 10, wherein the nitrile-containing rubber is a hydrogenated nitrile rubber.

12. The rubber composition of claim 1, 2 or 3, wherein the rubber is crosslinked with a peroxide.

13. The rubber composition of claim 1, 2 or 3, which further comprises a liquid nitrile rubber in an amount of 30 parts by weight or less based on 100 parts by weight of the solid rubber contained in the composition.

14. A rubber composition for use with fluorocarbons and/or refrigerating machine oil, said rubber composition consisting essentially of at least one rubber selected from the group consisting of a nitrile group-containing rubber, a chloroprene rubber, and an ethylene propylene rubber as a base and a compound represented by formula (I) (Compound (I)):

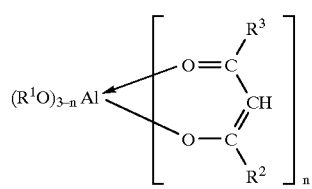

wherein $R^1$ represents a hydrogen atom or an alkyl group, $R^2$ represents an alkyl group or a phenyl group, $R^3$ represents an alkyl group, an alkoxy group or an alkenyloxy group, and n is 1 or 2, and wherein said Compound (I) is mixed in or otherwise incorporated into said base.

15. The rubber composition of claim 14, wherein $R^1$ is an isopropyl group or a sec-butyl group, $R^2$ is a methyl group, $R^3$ is an ethoxy group or —$OC_{18}H_{35}$, and n is 1.

16. The rubber composition of claim 14, wherein Compound (I) is used in an amount of from 0.01 to 20.0 parts by weight based on 100 parts by weight of the rubber.

17. The rubber composition of claim 14, wherein the rubber is the nitrile-containing rubber.

18. The rubber composition of claim 17, wherein the nitrile-containing rubber is a hydrogenated nitrile rubber.

19. The rubber composition of claim 14, wherein the rubber is crosslinked with a peroxide.

20. The rubber composition of claim 14, which further comprises a liquid nitrile rubber in an amount of 30 parts by weight or less based on 100 parts by weight of the solid rubber contained in the composition.

21. A molding made from a rubber composition which consists essentially of at least one rubber selected from the group consisting of a nitrile group-containing rubber, a chloroprene rubber, and an ethylene propylene rubber as a base and a monofunctional epoxy compound, wherein said monofunctional epoxy compound is mixed in or otherwise incorporated into said base.

22. A molding made from a rubber composition which consists essentially of at least one rubber selected from the group consisting of a nitrile group-containing rubber, a chloroprene rubber, and an ethylene propylene rubber as a base and a glycidyl ether type epoxy compound, wherein said glycidyl ether type epoxy compound is mixed in or otherwise incorporated into said base.

23. A molding made from a rubber composition which consists essentially of at least one rubber selected from the group consisting of a nitrile group-containing rubber, a chloroprene rubber, and an ethylene propylene rubber as a base and a monofunctional glycidyl ether type epoxy compound, wherein said monofunctional glycidyl ether type epoxy compound is mixed in or otherwise incorporated into said base.

24. A molding made from a rubber composition which consists essentially of at least one rubber selected from the group consisting of a nitrile group-containing rubber, a chloroprene rubber, and an ethylene propylene rubber as a base and a compound represented by formula (I) (Compound (I)):

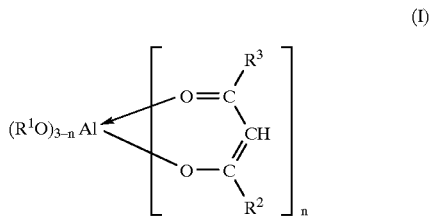

wherein $R^1$ represents a hydrogen atom or an alkyl group, $R^2$ represents an alkyl group or a phenyl group, $R^3$ represents an alkyl group, an alkoxy group or an alkenyloxy group, and n is 1 or 2, and wherein said Compound (I) is mixed in or otherwise incorporated into said base.

* * * * *